US012785148B2

(12) United States Patent
Mogensen et al.

(10) Patent No.: US 12,785,148 B2
(45) Date of Patent: Nov. 3, 2026

(54) ELECTROLYTE SOLUTION COMPRISING AN ALKALI METAL BIS (OXALATO)BORATE SALT

(71) Applicant: ALTRIS AB, Uppsala (SE)

(72) Inventors: Ronnie Mogensen, Uppsala (SE); William Brant, Uppsala (SE); Reza Younesi, Uppsala (SE); Simon Colbin, Uppsala (SE)

(73) Assignee: ALTRIS AB, Uppsala (SE)

(*) Notice: Subject to any disclaimer, the term of this patent is extended or adjusted under 35 U.S.C. 154(b) by 1179 days.

(21) Appl. No.: 17/635,829

(22) PCT Filed: Aug. 7, 2020

(86) PCT No.: PCT/EP2020/072278

§ 371 (c)(1),
(2) Date: Feb. 16, 2022

(87) PCT Pub. No.: WO2021/032510

PCT Pub. Date: Feb. 25, 2021

(65) Prior Publication Data

US 2022/0302503 A1 Sep. 22, 2022

(30) Foreign Application Priority Data

Aug. 20, 2019 (EP) .................................... 19192602

(51) Int. Cl.
*H01M 10/0569* (2010.01)
*H01M 4/02* (2006.01)
(Continued)

(52) U.S. Cl.
CPC ......... *H01M 10/0569* (2013.01); *H01M 4/58* (2013.01); *H01M 10/0568* (2013.01);
(Continued)

(58) Field of Classification Search
None
See application file for complete search history.

(56) References Cited

U.S. PATENT DOCUMENTS

| | | | | |
|---|---|---|---|---|
| 7,172,834 B1 | 2/2007 | Jow et al. | | |
| 2002/0192553 A1* | 12/2002 | Barker | ................ | H01M 4/5815 429/231.9 |

(Continued)

FOREIGN PATENT DOCUMENTS

| | | | |
|---|---|---|---|
| CN | 106935909 A | 7/2017 | |
| CN | 109216763 | 1/2019 | |

(Continued)

OTHER PUBLICATIONS

Wang (Wang, J., Yamada, Y., Sodeyama, K. et al. Fire-extinguishing organic electrolytes for safe batteries. Nat Energy 3, 22-29 (2018). https://doi.org/10.1038/s41560-017-0033-8 (Year: 2018).*

(Continued)

*Primary Examiner* — Jonathan G Leong
*Assistant Examiner* — Claire A Rutiser
(74) *Attorney, Agent, or Firm* — Ballard Spahr LLP

(57) ABSTRACT

Described is an electrolyte solution that contains an alkali-metal bis(oxalato)borate salt. Also described is a method for preparing such an electrolyte solution and to a battery cell that includes the electrolyte.

20 Claims, 7 Drawing Sheets

(51) Int. Cl.
*H01M 4/58* (2010.01)
*H01M 10/0568* (2010.01)

(52) U.S. Cl.
CPC ................. *H01M 2004/027* (2013.01); *H01M 2300/0037* (2013.01)

(56) References Cited

U.S. PATENT DOCUMENTS

| | | | | |
|---|---|---|---|---|
| 2012/0007560 | A1* | 1/2012 | Smart | H01M 4/525<br>429/188 |
| 2016/0071658 | A1 | 3/2016 | Azais et al. | |
| 2016/0204438 | A1* | 7/2016 | Umeyama | H01M 4/1391<br>427/58 |
| 2018/0019498 | A1 | 1/2018 | Sakaguchi et al. | |
| 2018/0026303 | A1 | 1/2018 | Sakaguchi et al. | |
| 2018/0251681 | A1 | 9/2018 | Zhang et al. | |
| 2018/0287198 | A1* | 10/2018 | Liu | C08L 33/06 |
| 2019/0123390 | A1* | 4/2019 | Xu | H01M 4/382 |
| 2020/0161706 | A1* | 5/2020 | Cao | H01M 10/05 |
| 2022/0231340 | A1* | 7/2022 | Barker | H01M 10/0567 |

FOREIGN PATENT DOCUMENTS

| | | |
|---|---|---|
| CN | 109494406 A | 3/2019 |
| JP | 2017010924 | 1/2017 |
| JP | 2018078102 | 5/2018 |
| WO | WO 2018/003992 | 1/2018 |

OTHER PUBLICATIONS

Chen, J., Huang, Z., Wang, C., Porter, S., Wang, B., Lie, W. & Liu, H. (2015). Sodium-difluoro(oxalato)borate (NaDFOB): A new electrolyte salt for Na-ion batteries. Chemical Communications, 51 (48), 9809-9812.

Chen, J., Huang, Z., Wang, C., Porter, S., Wang, B., Lie, W. & Liu, H. (2015). Sodium-difluoro(oxalato)borate (NaDFOB): A new electrolyte salt for Na-ion batteries, Supplementary Information. Chemical Communications, 51 (48).

Xu, K., Nonaqueous Liquid Electrolytes for Lithium-Based Rechargeable Batteries. Chemical Reviews 2004, 104 (10), 4303-4418.

Zavalij, P.Y., Yang, S., and Whittingham M.S., Structures of potassium, sodium and lithium bis(oxalato)borate salts from powder diffraction data, Acta Crystallographica, Section B: Structural Science, 2003, 59, 753-759.

Chunhua, G., et al. , Synthesis of novel organic-ligand-doped sodium bis(oxalate)-borate complexes with tailored thermal stability and enhanced ion conductivity for sodium ion batteries, J. Power Sources, 2014, 248, 77-82.

International Search Report and Written Opinion were mailed on Nov. 9, 2020 by the International Searching Authority for International Application No. PCT/EP2020/072278 filed on Jun. 22, 2020 and published as WO 2021/032510A1 (Applicant—Altris AB) (20 pages).

Kim, et al. “Hexacyanometallates for sodium-ion batteries: insights into higher redox potentials using d electronic spin configurations,” Phys. Chem. Chem. Phys., 2017, 19, 10443-10452.

* cited by examiner

Charge

Discharge

Charge

Discharge

ELECTROLYTE SOLUTION COMPRISING AN ALKALI METAL BIS (OXALATO)BORATE SALT

CROSS-REFERENCE TO RELATED APPLICATIONS

This application is a U.S. National Phase Application of International Application No. PCT/EP2020/072278, filed Aug. 7, 2020, which claims priority to European Application No. 19192602.1, filed Aug. 20, 2019, each of which are hereby incorporated by reference in their entirety.

TECHNICAL FIELD

The present disclosure generally relates to an electrolyte solution comprising an alkali-metal bis(oxalato)borate salt. The present disclosure also relates to a method for preparing such an electrolyte solution and to a battery cell comprising the electrolyte.

BACKGROUND

Lithium ion based batteries dominate the market for rechargeable batteries. However, the technology has drawbacks, not at least the relatively scarce resources of lithium. Although better than previous generations of secondary battery technologies, the lithium ion based batteries are not environmentally friendly, and also costly from a recycling perspective.

Sodium ion batteries represent an attractive alternative to lithium ion batteries and are arguably the most viable means of supporting renewable energy sources for the purpose of load leveling and storing excess energy.

The performance of sodium ion batteries is dependent on the properties of the electrode materials, and also on the properties of the electrolyte. The electrolyte is a critical part of the battery, and the performance thereof directly affects the performance of the sodium ion battery.

Electrolytes can be grouped into four categories: organic electrolytes, organic liquid based electrolytes, aqueous electrolytes, and solid or polymer-based electrolytes.

An organic liquid based electrolyte typically comprises a salt and an organic solvent. Compared to lithium salts, sodium salts are often less soluble in organic solvents, which limits the choice of such electrolytes.

Often, fluorinated sodium salts are used in electrolytes for sodium ion batteries. Examples of salts used for electrolyte applications include sodium hexafluorophosphate ($NaPF_6$), sodium tetrafluoroborate ($NaBF_4$), sodium perchlorate ($NaClO_4$), sodium trifluoromethanesulfonate ($NaCF_3SO_3$), sodium bis(trifluoromethanesulfonyl)imide (NaTFSI) and sodium bis(fluorosulfonyl)imide (NaFSI).

All the anions of the above mentioned salts have drawbacks. For example, $ClO_4$ is a strong oxidant, and the other anions all contain fluorine.

Although the use of fluorinated salts may yield a high ionic conductivity, the use of fluorine based salts is accompanied by many intrinsic safety concerns, especially at high temperatures and in the presence of moisture. Leakage of harmful liquids and gassing may occur, and the batteries may also require special packaging.

A more environmentally friendly, fluorine free and non-toxic sodium salt, as well as an electrolyte solution is therefore desired. The challenge in such development is to find a non-fluorinated salt that is soluble in the organic solvent used.

Recently, lithium bis(oxalato)borate (LiBOB) has attracted attention as a promising candidate for lithium ion battery applications. The LiBOB salt has many advantages such as low cost, wide potential window, high thermal stability, and is also fluorine free.

Zavalij et al[1] (*Structures of potassium, sodium and lithium bis(oxalato)borate salts from powder diffraction data, Acta Crystallographica, Section B: Structural Science,* 2003) discusses the use of lithium bis(oxalato)borate, also referred to as LiBOB, in lithium ion electrolyte applications. However, its sodium counterpart, sodium bis(oxalato)borate (NaBOB), which is also discussed in Zavalij et al[1], is expressly mentioned as being unsuitable for electrolyte applications. This is due to the difficulties of dissolving this salt.

The limited solubility of NaBOB, and thereby inappropriateness in sodium ion battery applications has previously been recognized by Cheng et al.[2] and Wang et al.[3].

In view of the above, there is a need to develop a high conductive sodium ion electrolyte suitable for use in sodium ion battery applications. Such electrolyte should be free from fluorine ions, safe and environmentally friendly.

SUMMARY

In view of above-mentioned and other drawbacks of the prior art, it is an object of the present disclosure to provide improvements in relation to fluorine free and more environmentally friendly electrolytes and their use in sodium ion battery applications.

According to an aspect of the present disclosure, it is therefore provided, an electrolyte solution comprising:

an alkali-metal bis(oxalato)borate salt, wherein the alkali metal ion is selected from sodium ($Na^+$) and potassium ($K^+$)

an organic solvent comprising a pyrrolidone and/or a phosphoric acid ester compound.

Despite the dissolution difficulties explained in the literature with respect to sodium bis(oxalato)borate salt, hereinafter referred to as NaBOB, the present inventors have surprisingly found that this salt may be dissolved in an organic solvent selected from a pyrrolidone and a phosphoric acid ester based solvent.

Accordingly, a fluorine-free, more environmentally friendly and safe electrolyte solution is obtained. The resulting electrolyte solution has an ionic conductivity and electrochemical stability that renders the electrolyte a commercially attractive solution for sodium ion batteries. The electrolyte may also be applicable for potassium ion battery applications, due to the isostructural similarity between the potassium and sodium versions of the bis(oxalate)borate salt (Zavalij et al[1]).

The use of NaBOB does not generate any toxic or dangerous products when exposed to air and water.

In embodiments, the organic solvent is N-alkyl-2-pyrrolidone having the following structure:

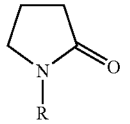

wherein R is selected from an alkyl group comprising 1-8 carbon atoms, preferably 1-4 carbon atoms.

An alkyl group having a longer chain may render the organic solvent interactive with hydrophobic substances, and may also make it more prone to permeating through the skin.

Preferably, R is selected from a methyl or an ethyl group.

In embodiments, the organic solvent is N-methyl-2-pyrrolidone (NMP).

The inventors have surprisingly found that sodium bis(oxalato)borate can be fully dissolved in NMP even at high concentrations of the salt.

The resulting electrolyte formulation has a high ionic conductivity and is electrochemically stable at high voltages applied in sodium ion battery electrodes. The inventors have performed several experiments to demonstrate the potential of an electrolyte solution comprising NaBOB dissolved in NMP in battery applications, as is further elucidated in the Example section hereinafter.

In alternative embodiments, the organic solvent is trialkyl phosphate having the following structure:

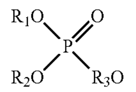

wherein $R_1$, $R_2$ and $R_3$ are independently selected from an alkyl group comprising 1-6 carbon atoms, preferably 1-3 carbon atoms.

Preferably, $R_1$, $R_2$ and $R_3$ are independently selected from a methyl or an ethyl group.

In embodiments, the organic solvent is trimethyl phosphate (TMP).

An electrolyte solution comprising TMP exhibits excellent conductive properties, and is electrochemically stable. The electrolyte can be successfully used in high voltage sodium ion batteries, as is further demonstrated in the Example section.

In embodiments, the organic solvent comprises a mixture of a pyrrolidone and a phosphoric acid ester compound, preferably a mixture of N-methyl-2-pyrrolidone (NMP) and trimethyl phosphate (TMP).

In embodiments, the organic solvent comprises N-methyl-2-pyrrolidone (NMP) and trimethyl phosphate (TMP) in a range of from 40:60 to 90:10.

Such an electrolyte solution has an improved ionic conductivity and is electrochemically stable.

The concentration of the salt in the electrolyte solution may be between 0.3 and 1.5 M.

A too low concentration means insufficient charge carriers, and thus a lower conductivity. If the concentration of the salt is too high, this may increase viscosity, induce ion pairing and add cost.

Preferably, the concentration of salt in the electrolyte solution is between 0.4 and 0.8 M, more preferably between 0.5 and 0.6 M.

These ranges have been found beneficial for yielding an electrolyte solution which can successfully be used in sodium ion battery applications.

The electrolyte solution preferably has a conductivity above 4 mS/cm.

According to another aspect, there is provided a battery cell comprising at least one electrode and an electrolyte solution as explained hereinbefore.

In embodiments, the electrode is a positive electrode; i.e. a cathode, comprising a Prussian blue analog material with the chemical formula $Na_2Fe_2(CN)_6$.

The Prussian blue analog may be referred to as Prussian white and is a framework material comprising sodium, iron, carbon and nitrogen. The large pores inside the material enable the capture and storage of a wide range of atoms or molecules.

The Prussian blue analog is environmentally friendly and can be produced at a low cost.

According to another aspect of the present disclosure, there is provided a method for preparing an electrolyte solution comprising:

- providing an alkali-metal bis(oxalato)borate salt, wherein the alkali metal ion is selected from sodium ($Na^+$) and potassium ($K^+$)
- dissolving said salt in an organic solvent comprising a pyrrolidone and/or a phosphoric acid ester compound.

In embodiments, the salt is dissolved in the organic solvent in a concentration of from 0.3 to 1.5 M, preferably of from 0.4 to 0.8 M.

In embodiments, the organic solvent is N-alkyl-2-pyrrolidone having the following structure:

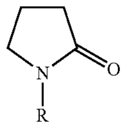

wherein R is selected from an alkyl group comprising 1-8 carbon atoms, preferably 1-4 carbon atoms.

In alternative embodiments, the the organic solvent is trialkyl phosphate having the following structure:

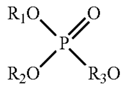

wherein $R_1$, $R_2$ and $R_3$ are independently selected from an alkyl group comprising 1-6 carbon atoms, preferably 1-3 carbon atoms.

Preferably, the organic solvent is N-methyl-2-pyrrolidone (NMP) and/or trimethyl phosphate (TMP).

Further features of, and advantages with, the present disclosure will become apparent when studying the appended claims and the following description. The skilled addressee realizes that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawings, in which.

DETAILED DESCRIPTION

Sodium bis(oxalato)borate (NaBOB) has the following chemical formula:

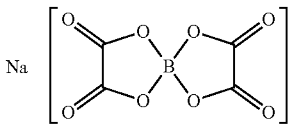

The NaBOB salt is known for its difficulties in becoming dissolved, so the fact that the present inventors have found that the salt can be dissolved, and also successfully used in sodium ion battery application, is surprising.

The crystal structure of NaBOB and KBOB differ significantly from the crystal structure of LiBOB, and this may explain why the sodium and potassium versions of the salt are so difficult to dissolve. The smaller size of the Li ion leads to chains and consequently a framework that is different from that found in the Na and K structures. The BOB ion also behaves differently (Zavalij et al[1]).

The chemical and physical nature of the organic solvents, according to the present disclosure, weaken the interactions between the cation and anion of the NaBOB salt, and allows for disordering of the ions as they move from the ordered crystalline structure of the NaBOB salt in the solution. The resulting more delocalized charge gives the anion less affinity for $Na^+$, yielding a better conductivity.

Figure 1:
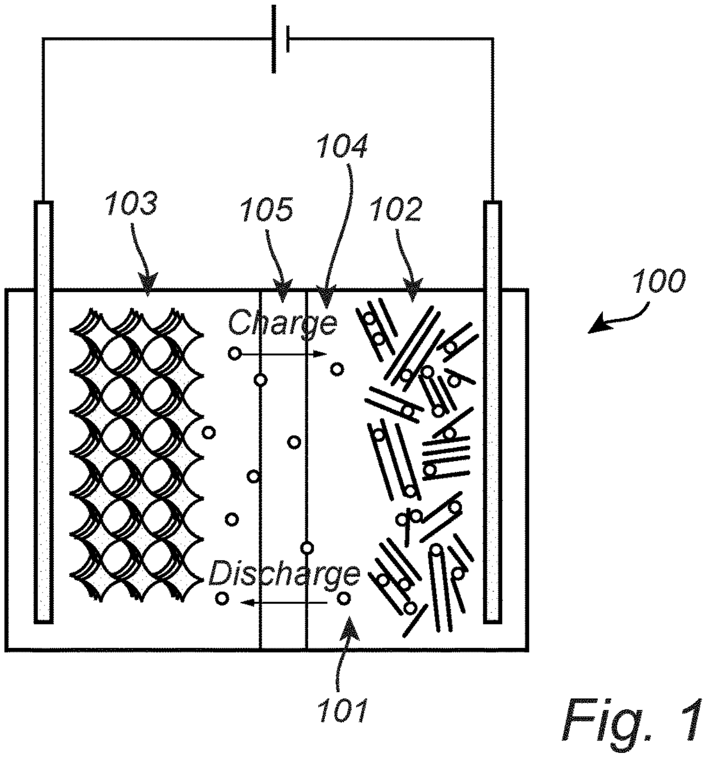
FIG. 1 schematically illustrates a sodium ion battery.

FIG. 1 illustrates the schematic principles of a sodium ion battery (SIB) 100 utilizing sodium ions 101 as charge carriers. The SIB stores energy in chemical bonds of the negative electrode 102. Charging the battery 100 forces $Na^+$ ions 101 to de-intercalate from the positive electrode 103 and migrate towards the negative electrode 102. During discharge, the process reverses. Once a circuit is completed, electrons pass back from the negative electrode 102 to the positive electrode 103 and the $Na^+$ ions 101 travel back to the positive electrode 103. During discharge of an SIB, as illustrated in FIG. 1, oxidation takes place at the negative electrode 102, while reduction takes place at the positive electrode 103. The current flow is determined by the potential difference between the positive electrode 103 and the negative electrode 102, the cell voltage.

The two electrodes are separated by the electrolyte 104; i.e. an electrolyte solution according to the present disclosure.

As used herein the term “battery” means a device comprising one or more electrochemical cells.

In an “electrochemical cell”, chemical energy is transformed into electricity by reduction and oxidation (redox) reactions at the electrodes.

The electrode(s) used in a battery cell of the present disclosure may comprise any electrode material commonly used in sodium ion batteries. The electrolyte solution of the present disclosure is compatible with a wide range of electrodes.

For example, the positive electrode may comprise a phosphate based material, such as $NaFePO_4$, $NaVPO_4F$, $Na_3V_2(PO_4)_3$, $Na_2FePO_4F$ and $Na_3V_2(PO_4)_3$. Alternatively, it may comprise a transition metal compounds, e.g. $NaNi_{0.5}Mn_{0.5}O_2$, $Na_{2/3}Mn_{2/3}Ni_{1/3-x}Mg_xO_2$, $Na_{0.44}MnO_2$, $Na_{1+x}V_3O_8$, $NaFeO_2$, sulfides and Prussian blue analogues (of general form: $Na_2M[M(CN)_6]$, wherein M is a transition metal).

In embodiments, the positive electrode material comprises a Prussian blue analog material with the chemical formula $Na_2Fe[Fe(CN)_6]$.

Such a material may be obtained according to the method described in WO2018/056890, which is incorporated herein by reference.

A battery cell comprising a Prussian blue analog material with the chemical formula $Na_2Fe[Fe(CN)_6]$ and the electrolyte solution as described hereinbefore is environmentally friendly and can be produced at a low cost. The combination pushes sodium ion battery technology towards a completely environmentally friendly and safe system as Prussian blue itself contains no toxic elements The conductivity paired with the good rate capability of the cathode material allows for fast charging and discharging The negative electrode material is not particularly limited as long as it is a material capable of storing/releasing sodium. Examples include metal composite oxides, sodium metal, sodium alloys, silicon, silicon-based alloys, tin-based alloys, bismuth-based alloys, metal oxides, conductive polymers such as polyacetylene, Na—Co—Ni-based materials, hard carbon and the like.

The battery cell may further comprise a separator 105 to prevent electrical short circuit between the negative and the positive electrodes, and to provide mechanical stability to the cell. The separator material can be any material which is chemically stable and electrically insulating, e.g. polymer films commonly made from polypropylene, polyethylene or combinations of these.

EXPERIMENTAL DATA

EXAMPLE 1: CHARACTERIZATION OF NaBOB BY POWDER DIFFRACTION

Figure 2:
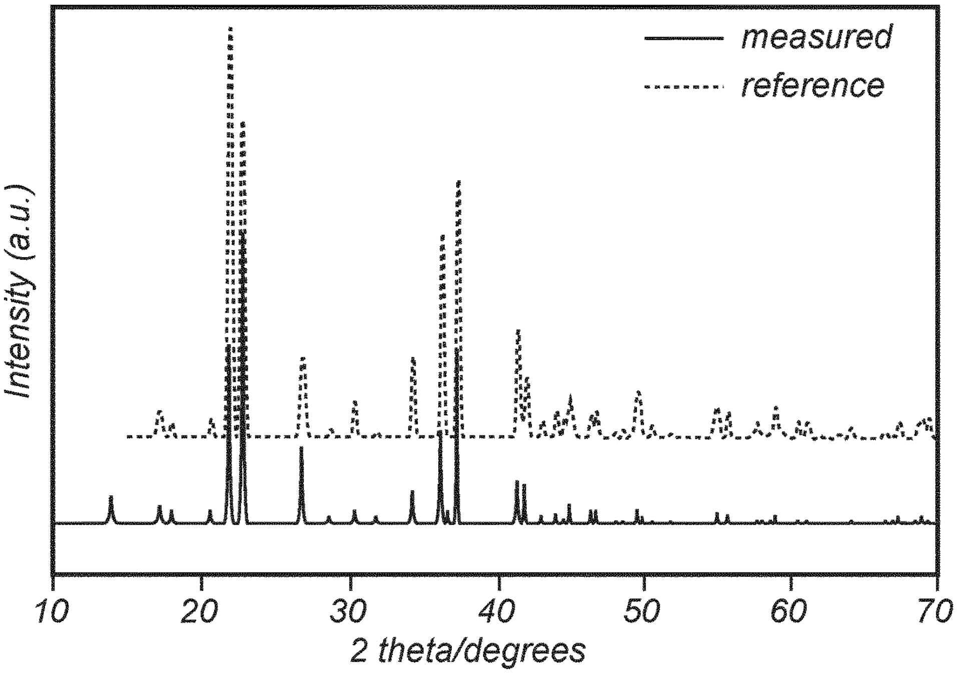
FIG. 2 illustrates the X-ray diffractogram of the sodium bis(oxalato)borate that was used to perform the electrochemical experiments.

First, the sodium bis(oxalato)borate salt (NaBOB) used for experimental data was structurally characterized by X-ray diffraction. The X-ray diffractogram is illustrated in FIG. 2. The diffraction pattern was compared with a reference diffractogram to confirm the identity of the salt and to confirm its purity. According to our data the salt used contained no crystalline impurities and showed a high degree of crystallinity.

EXAMPLE 2: PREPARATION OF THE ELECTROLYTE SOLUTIONS

The electrolytes were prepared in an argon-filled glovebox as follows: The NaBOB salt was carefully dried at 120° C. under vacuum. The NMP and TMP solvents were dried over molecular sieves. After drying the salt and solvents, these were added to volumetric vials in order to produce 0.5 M solutions.

EXAMPLE 3: CONDUCTIVITY OF THE ELECTROLYTE SOLUTIONS

The conductivity was measured using a METTLER TOLEDO SevenGo Duo pro conductivity meter using a METTLER TOLEDO InLab 738 ISM conductivity probe under inert atmosphere. The measurements were done following calibration by standard solutions and repeated three times. Calibration and measurements were performed at a temperature of 23° C.

The conductivity of 0.5 M NaBOB in NMP was 7.2 mS/cm. The conductivity of 0.5 M NaBOB in TMP was 4.6 mS/cm.

These results show that both electrolyte solutions exhibit a good conductivity, and demonstrate their potential for use in sodium ion battery applications.

EXAMPLE 4: CYCLING DATA AND ELECTROCHEMICAL STABILITY OF THE ELECTROLYTE SOLUTIONS

The electrodes used consisted of Prussian White slurry coated on aluminum foil together with CMC binder and additive carbon. The composition of the electrode was 85 wt % PW, 10 wt % C-65 carbon, and 5 wt % CMC binder with a total active mass loading of 2.5 mg PW on each 13 mm diameter electrode disk. For full-cells, 13 mm disks of hard-carbon was prepared in a similar manner with a composition of 95 wt % Hard carbon and 5 wt % CMC binder. The loading of hard carbon was 1.43 mg per 13 mm diameter disk. For half-cells sodium counter electrodes were prepared by pressing metallic sodium on aluminum foil and punching 14 mm diameter disks.

Assembly of pouch-cells was performed under argon and the separator consisted of glass fiber and current collectors of aluminum. After stacking the electrodes and separator, 100 μL of the NMP 0.5M NaBOB or TMP 0.5M NaBOB electrolyte was added before sealing the cells under 5 mBar argon.

Galvanostatic cycling was performed on Landt Instruments Battery Test System Model CT2001A after 12 h soaking time following assembly. The cycling used a constant current corresponding to C/5 calculated from a positive electrode capacity of 150 mAh/g. The full-cells were cycled between 1 & 4 volts while half-cells were cycled between 2 & 4 volts.

Figure 3A:
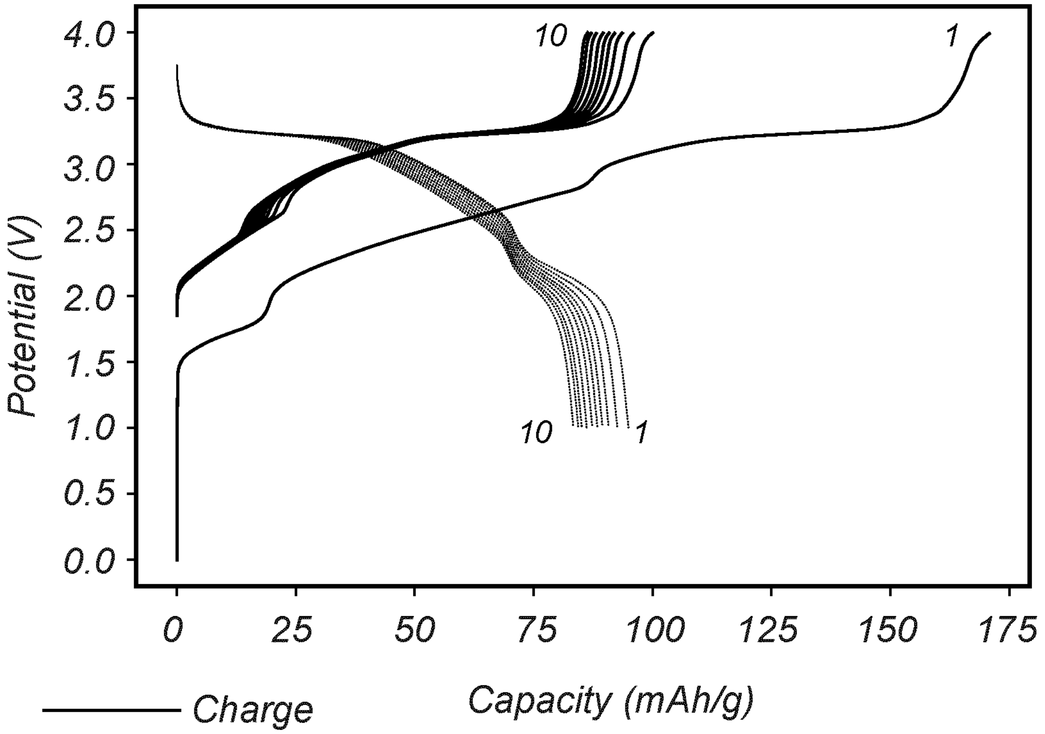
FIG. 3*a* illustrates the electrochemical behavior of an electrolyte solution according to one embodiment of the invention comprising sodium bis(oxalato)borate and N-methyl-2-pyrrolidone (NMP).

As illustrated in the electrochemical cycling of FIG. 3*a*), a stable electrochemical behavior of NMP 0.5M NaBOB electrolyte is observed in a full-cell consisting of a Prussian white positive electrode and hard-carbon negative electrode over 10 cycles at C/5 cycling rate.

Figure 3B:
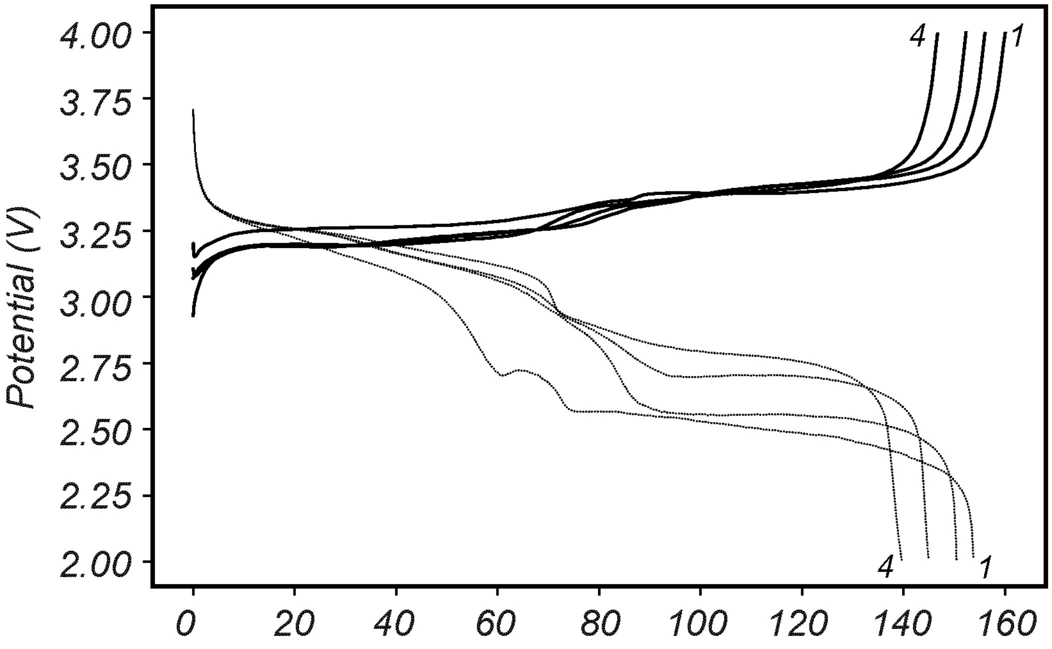
FIG. 3*b* illustrates the electrochemical behavior of an electrolyte solution according to an alternative embodiment of the invention comprising sodium bis(oxalato)borate and trimethyl phosphate (TMP).

As illustrated in the electrochemical cycling in FIG. 3*b*, a stable electrochemical behavior of TMP 0.5M NaBOB electrolyte is observed in a half-cell consisting of a Prussian white positive electrode and metallic sodium negative electrode over 4 cycles at C/5 cycling rate.

To summarize, these results demonstrate that the electrolyte solutions of the present disclosure exhibit a good electrochemical behavior, and are suitable for use in sodium ion battery applications.

EXAMPLE 5: SOLUBILITY AND ELECTROCHEMICAL PROPERTIES OF ELECTROLYTE SOLUTIONS COMPRISING VARIOUS AMOUNTS OF NMP AND TMP

Tests were also performed to evaluate the solubility and the ionic conductivity of NaBOB when NMP, TMP and mixtures of NMP and TMP were used as the organic solvent. Various concentrations of NMP and TMP were evaluated as illustrated in table 1 below. The electrolyte solutions were prepared as specified in Example 2 above, and the concentration of NaBOB in the electrolyte solutions was the maximum solubility for each combination reported in table 1. The ionic conductivity of each sample was measured at lab temperature (23° C.) and in accordance with Example 3 above. $NaPF_6$ was used as a reference electrolyte solution for comparative purposes. 1 M $NaPF_6$ was dissolved in 1:1 EC:DEC (ethylene carbonate:diethyl carbonate).

TABLE 1

Solubility and Ionic conductivity

| Sample | NMP (vol %) | TMP (vol %) | Maximum solubility (M) | Maximum conductivity ($mS \cdot cm^{-1}$) |
|---|---|---|---|---|
| NMP | 100 | 0 | 0.66 | 8.83 |
| 90:10 | 90 | 10 | 0.65 | 8.50 |
| 80:20 | 80 | 20 | 0.64 | 8.15 |
| 70:30 | 70 | 30 | 0.61 | 7.77 |
| 60:40 | 60 | 40 | 0.6 | 7.40 |
| 50:50 | 50 | 50 | 0.58 | 7.10 |
| 40:60 | 40 | 60 | 0.56 | 6.65 |
| 30:70 | 30 | 70 | 0.53 | 6.03 |
| 20:80 | 20 | 80 | 0.50 | 5.71 |
| 10:90 | 10 | 90 | 0.46 | 5.13 |
| TMP | 0 | 100 | 0.42 | 4.50 |
| Reference ($NaPF_6$) | N/A | N/A | 1M | 6.44 |

As illustrated in table 1, NaBOB can successfully be dissolved in an electrolyte solution comprising a mixture of NMP and TMP, and the electrolyte solutions exhibit a significantly improved conductivity compared to the state of the art electrolyte solution. This is particularly the case when the organic solvent comprises a mixture of NMP and TMP in a range of from 40:60 to 90:10.

The cycling performance for all the samples was evaluated both at a temperature of 23° C. (FIG. 4) and at a temperature of 55° C. (FIG. 5*a*-*b*) as well as at low temperatures (FIGS. 5*c* and 5*d*).

The cycling performance was evaluated in a similar manner as described in Example 4 with the exception that the first five cycles were carried out at C/5 rate and all following cycles at 1C rate.

Figure 4:
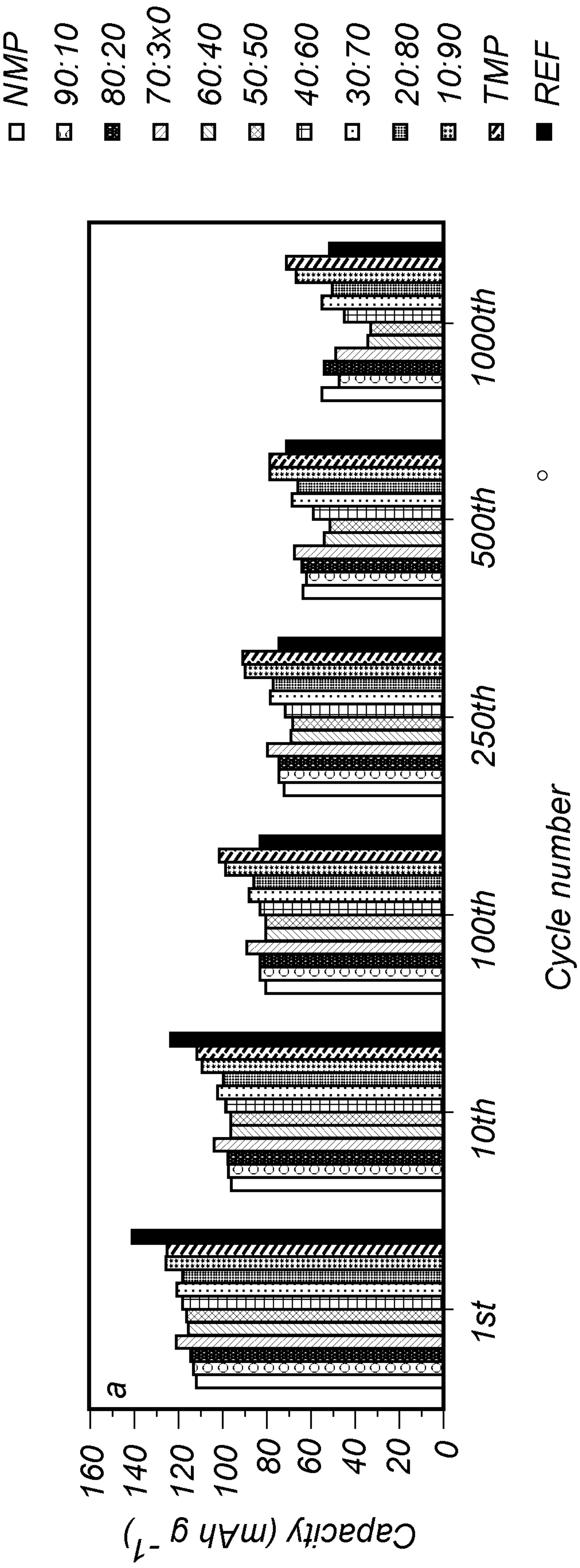
FIG. 4 illustrates the capacity of electrolyte solutions comprising sodium bis(oxalato)borate and N-methyl-2-pyrrolidone (NMP), trimethyl phosphate (TMP), and mixtures thereof according to exemplary embodiments of the present disclosure compared to a reference electrolyte solution.

As illustrated in FIG. 4, a battery comprising an electrolyte solution of the present disclosure; i.e. NaBOB dissolved in NMP, TMP or mixtures thereof, demonstrates a high capacity even at high numbers of charge cycles. In general, the number of cycles indicates how many times the battery can undergo the process of complete charging and discharging until failure or until significant capacity loss. The capacity is a measure of the charge stored by the battery and is determined by the mass of active positive electrode material contained in the battery. The battery capacity represents the maximum amount of energy that can be extracted from the battery under certain specified conditions.

In addition, the average Coulombic efficiency was measured for each of the samples. The Coulombic efficiency (CE) is a measure of the charge efficiency by which electrons are transferred in batteries. CE is the ratio of the total charge extracted from the battery to the total charge put into the battery over a full cycle. An average of the Coulombic efficiency for cycle 10-1000 is illustrated in table 2 below.

TABLE 2

Average Coloumbic efficiency

| Sample | Average Coulombic efficiency |
|---|---|
| NMP | 99.78 |
| 90:10 | 99.78 |
| 80:20 | 99.78 |
| 70:30 | 99.74 |
| 60:40 | 99.72 |
| 50:50 | 99.72 |
| 40:60 | 99.72 |
| 30:70 | 99.76 |
| 20:80 | 99.78 |
| 10:90 | 99.81 |
| TMP | 99.85 |
| Reference ($NaPF_6$) | 99.79 |

Table 2 demonstrates that all combinations of NMP and TMP exhibit equivalent or superior coulombic efficiency on average to the reference electrolyte, thereby confirming that the electrolytes possess practical electrochemical stability.

Figures 5A, 5B:
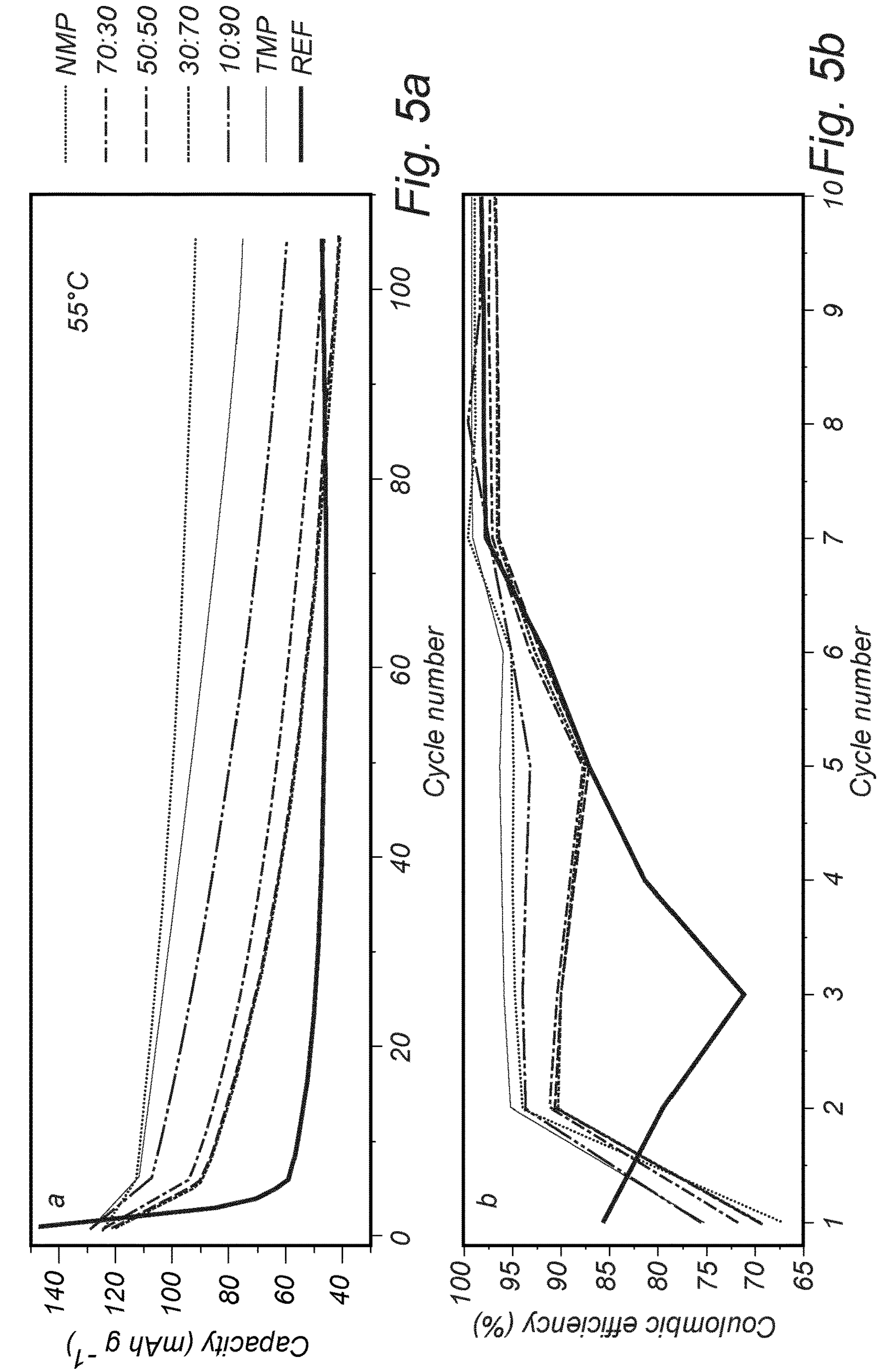
FIG. 5*a* illustrates the capacity of electrolyte solutions comprising sodium bis(oxalato)borate and N-methyl-2-pyrrolidone (NMP), trimethyl phosphate (TMP), and mixtures thereof according to exemplary embodiments of the present disclosure compared to a reference electrolyte solution at a temperature of 55° C.
FIG. 5*b* illustrates the Coulombic efficiency of electrolyte solutions comprising sodium bis(oxalato)borate and N-methyl-2-pyrrolidone (NMP), trimethyl phosphate (TMP), and mixtures thereof according to exemplary embodiments of the present disclosure compared to a reference electrolyte solution at a temperature of 55° C.
Figure 5C:
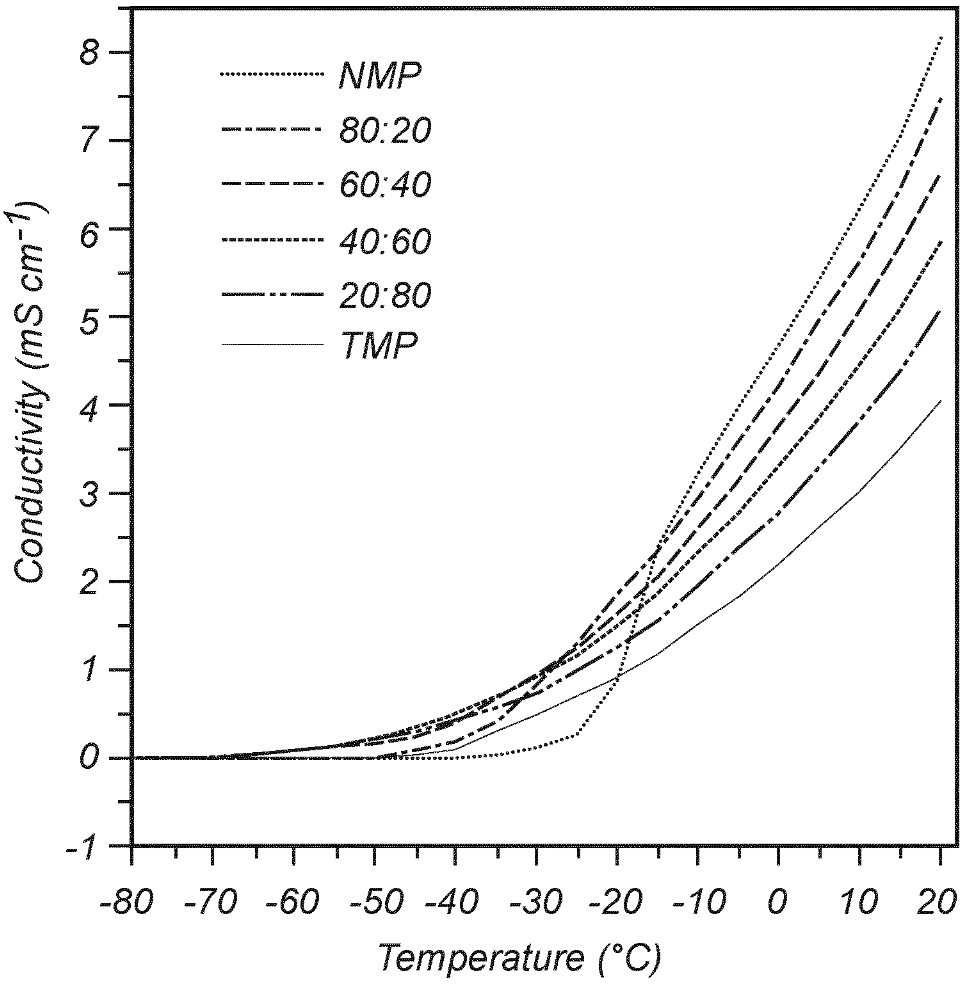
FIG. 5*c* illustrates the conductivity of the electrolyte solutions comprising sodium bis(oxalato)borate and N-methyl-2-pyrrolidone (NMP), trimethyl phosphate (TMP), and mixtures thereof according to exemplary embodiments of the present disclosure at low temperature.
Figure 5D:
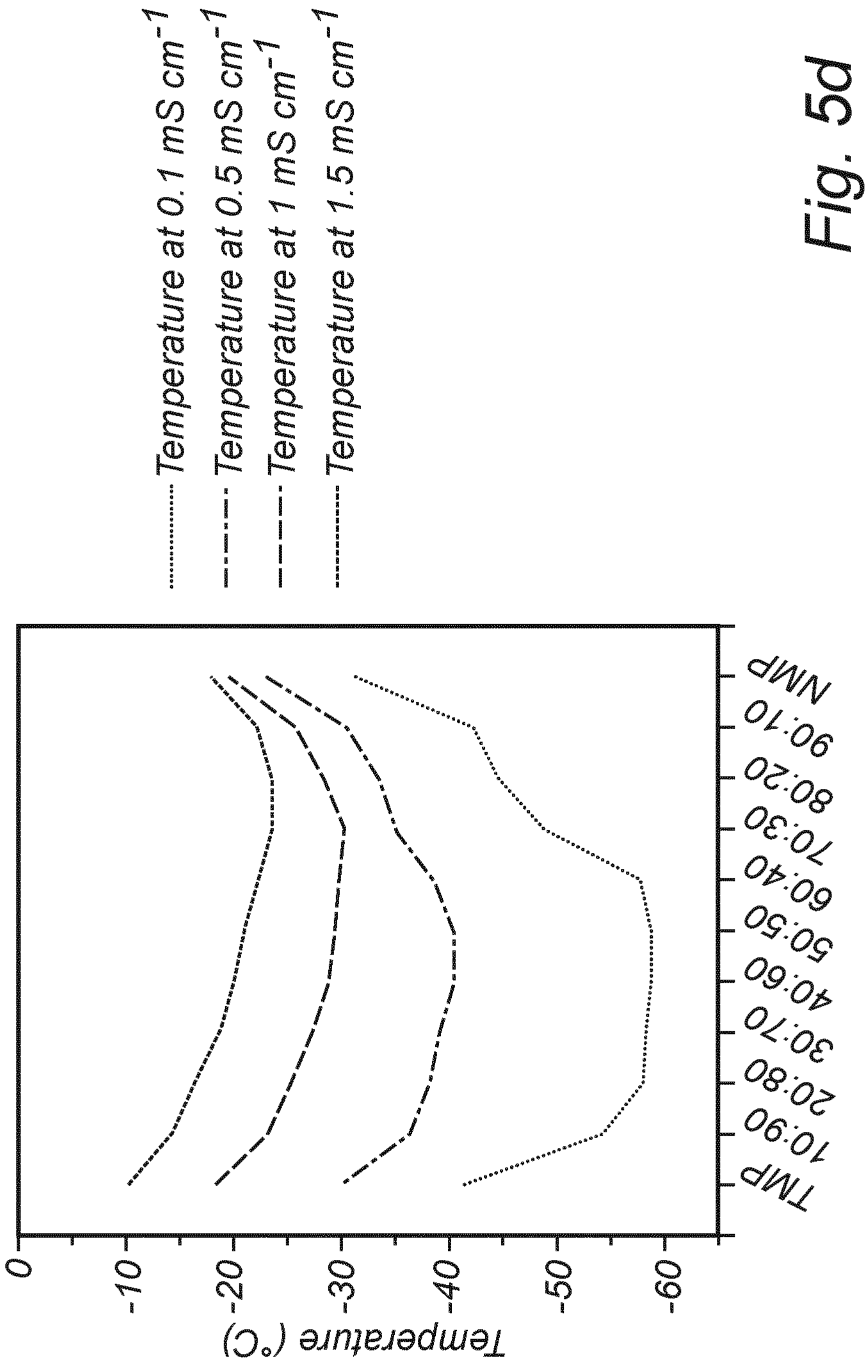
FIG. 5*d* illustrates the minimum temperature at which critical conductivity limits are reached for the electrolyte solutions comprising sodium bis(oxalato)borate and N-methyl-2-pyrrolidone (NMP), trimethyl phosphate (TMP), and mixtures thereof according to exemplary embodiments of the present disclosure.

To demonstrate the performance of the electrolyte solutions of the present disclosure at elevated temperatures, the capacity and the Coulombic efficiency was measured at a temperature of 55° C. The results are illustrated in FIGS. 5*a* and 5*b*. As can be seen, the electrolytes of the present disclosure display a superior performance than the reference electrolyte at a temperature of 55° C.

Tests were also carried out the evaluate the ionic conductivity of the electrolyte solutions of the present disclosure at low temperatures. As illustrated in FIG. 5*c*, the electrolytes maintain good ionic conductivity at low temperatures with mixtures of NMP and TMP, in particular maintaining 1 mS/cm conductivity down to −30° C. and 0.1 mS/cm down to −55° C. For reference, previously the freezing temperature for a state of the art electrolyte for lithium was reported as −7.6° C. (Xu et al.[4]).

FIG. 5*d* emphasizes the minimum temperature at which critical conductivity limits are reached for each electrolyte mixture. For example, the highest curve is the lowest temperature for each electrolyte combination at which a conductivity of 1.5 mS $cm^{-1}$ is achievable.

EXAMPLE 6: SOLUBILITY OF NaBOB IN DIFFERENT SOLVENTS

In order to evaluate the solubility of NaBOB in alternative solvents, each solvent was saturated with NaBOB by keeping the solvent over an excess quantity of NaBOB salt for several days. After this, the solvent was filtered free of precipitates and a known volume was added to a container. This known volume of saturated solvent was evaporated and the NaBOB that was left was measured gravimetrically to find how much had dissolved. The results are illustrated in table 3 below.

TABLE 3

Solubility of NaBOB in various solvents at 23° C.

| Solvent | Solubility of NaBOB (g/l) |
|---|---|
| Sulfolane (TMS) | insoluble |
| Gamma-Butyrolactone (GBL) | 0.0488 |
| Propylene carbonate (PC) | 0.0008 |
| Ethyl acetate (EA) | 0.0025 |
| Dimethyl ether (DME) | 0.0026 |
| Tetraethylene glycol dimethyl ether (TEGDME) | 0.0132 |
| Methyl acetate (MA) | 0.0010 |
| Ethyl propionate (EP) | 0.0030 |
| Ethyl butyrate (EB) | 0.0016 |
| Methyl propionate (MP) | 0.0025 |
| Gamma-Valerolactone (GVL) | 0.0090 |
| NMP | 0.139 |
| TMP | 0.089 |

As can be seen, NaBOB had almost no solubility in any solvent except for NMP and TMP.

EXAMPLE 7: CYCLING DATA AND ELECTROCHEMICAL STABILITY OF AN ELECTROLYTE SOLUTION COMPRISING NaBOB AND TRIETHYL PHOSPHATE (TEP)

Tests were also performed to evaluate the cycling performance of an electrolyte solution comprising triethyl phosphate (TEP) and NaBOB.

The electrolyte solution was first prepared by the same method as in example 2. The concentration of NaBOB in the electrolyte solution was 0.4 M.

Figure 6A:
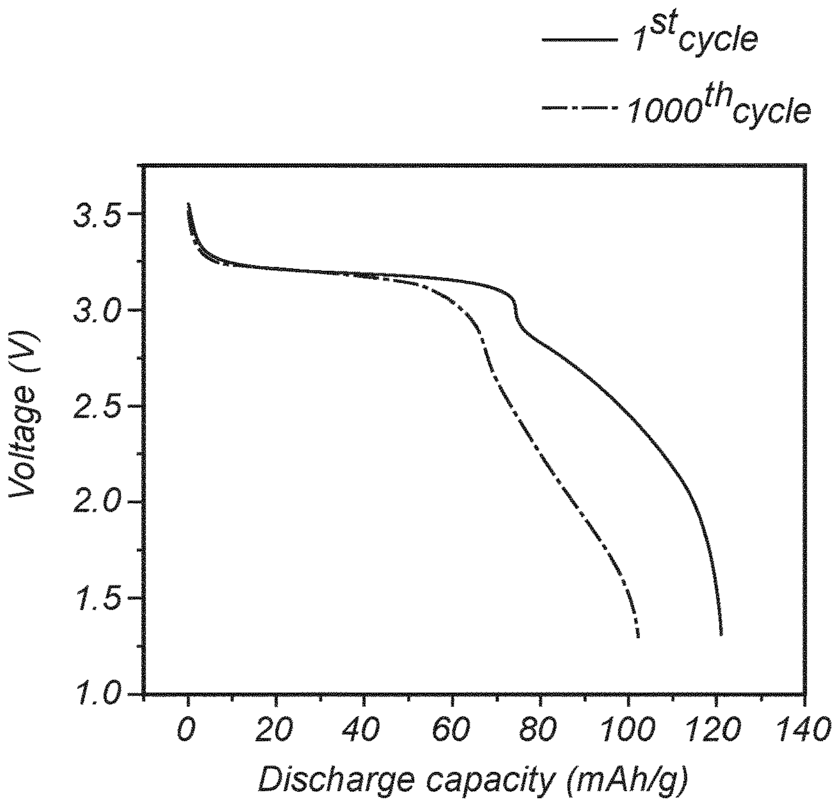
FIG. 6*a* illustrates the electrochemical behavior of an electrolyte solution according an exemplary embodiment of the present disclosure comprising sodium bis(oxalato)borate and triethyl phosphate (TEP).
Figure 6B:
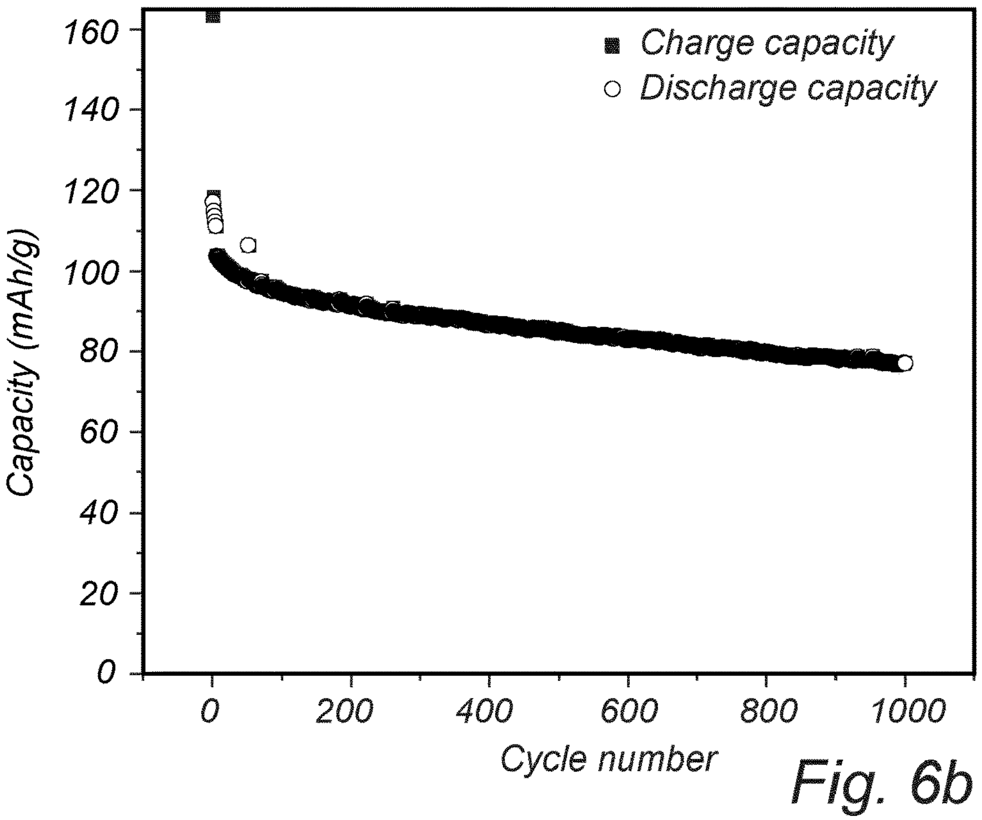
FIG. 6*b* illustrates the charge and discharge capacity of an electrolyte solution according an exemplary embodiment of the present disclosure comprising sodium bis(oxalato)borate, N-methyl-2-pyrrolidone (NMP) and triethyl phosphate (TEP).

The cycling performance is demonstrated in FIGS. 6*a* and 6*b*.

FIG. 6*a* shows the first and $1000^{th}$ discharge of a TEP-NaBOB electrolyte in a hard carbon—Prussian white battery. The first five cycles were performed at C/5 cycling rate, the following 994 at 1C cycling rate and the $1000^{th}$ at C/20 cycling rate.

FIG. 6*b* shows the charge and discharge capacity of an electrolyte consisting of 50 vol % TEP and 50 vol % NMP using NaBOB as the salt in a hard carbon—Prussian white battery. Here the battery has been cycled as it was in Example 5.

As can be seen, an electrolyte solution comprising NaBOB and TEP, and NABOB and a mixture of TEP and NMP, respectively, demonstrates excellent conductive properties, and is electrochemically stable.

Terms, definitions and embodiments of all aspects of the present disclosure apply mutatis mutandis to the other aspects of the present disclosure.

Even though the present disclosure has been described with reference to specific exemplifying embodiments thereof, many different alterations, modifications and the like will become apparent for those skilled in the art.

Variations to the disclosed embodiments can be understood and effected by the skilled addressee in practicing the present disclosure, from a study of the drawings, the disclosure, and the appended claims. Furthermore, in the claims, the word "comprising" does not exclude other elements or steps, and the indefinite article "a" or "an" does not exclude a plurality.

REFERENCES

1. P. Y. Zavalij, S. Yang and M. S. Whittingham, Structures of potassium, sodium and lithium bis(oxalato)borate salts from powder diffraction data, Acta Crystallographica, Section B: Structural Science, 2003, 59, 753-759.
2. Chen, J., Huang, Z., Wang, C., Porter, S., Wang, B., Lie, W. & Liu, H. (2015). Sodium-difluoro(oxalato)borate (NaDFOB): A new electrolyte salt for Na-ion batteries. Chemical Communications, 51 (48), 9809-9812.
3. C. Ge, L. Wang, L. Xue, Z.-S. Wu, H. Li, Z. Gong and X.-D. Zhang, Synthesis of novel organic-ligand-doped sodium bis(oxalate)-borate complexes with tailored thermal stability and enhanced ion conductivity for sodium ion batteries, J. Power Sources, 2014, 248, 77-82.
4. Xu, K., Nonaqueous Liquid Electrolytes for Lithium-Based Rechargeable Batteries. Chemical Reviews 2004, 104 (10), 4303-4418.

The invention claimed is:

1. An electrolyte solution comprising:

an alkali-metal bis(oxalato)borate salt, wherein the alkali metal ion is selected from sodium ($Na^+$) and potassium ($K^+$), and an organic solvent consisting of N-methyl-2-pyrrolidone (NMP), wherein NMP is the only organic solvent in the solution wherein the electrolyte solution is for use in a sodium or potassium ion battery cell, wherein the alkali-metal bis(oxalato)borate salt is dissolved in the organic solvent at a concentration of from 0.3 to 1.5 M.

2. The electrolyte solution according to claim 1, wherein the conductivity of said electrolyte solution is above 4 mS/cm at a temperature of 23° C.

3. A battery cell comprising at least one electrode and an electrolyte solution according to claim 1.

4. The battery cell according to claim 3, wherein said electrode is a positive electrode comprising a Prussian blue analog material with the chemical formula $Na_2Fe_2(CN)_6$.

5. The electrolyte solution according to claim 1, wherein the salt is dissolved in the organic solvent in a concentration of from 0.3 to 0.6 M.

6. The electrolyte solution according to claim 5, wherein the salt is dissolved in the organic solvent in a concentration of from 0.5 to 0.6 M.

7. The electrolyte solution according to claim 1, wherein the electrolyte solution is fluorine-free.

8. The electrolyte solution according to claim 1, wherein the alkali-metal bis(oxalato)borate salt is sodium bis(oxalato)borate salt.

9. The electrolyte solution according to claim 1, wherein the alkali-metal bis(oxalato)borate salt is potassium bis (oxalato)borate salt.

10. An electrolyte solution comprising:

an alkali-metal bis(oxalato)borate salt, wherein the alkali metal ion is selected from sodium (Na+) and potassium (K+), and an organic solvent or organic solvents, wherein the only organic solvent(s) in the electrolyte solution are selected from the group consisting of N-methyl-2-pyrrolidone (NMP), trimethyl phosphate (TMP), triethyl phosphate (TEP), and combinations thereof wherein the electrolyte solution is for use in a sodium or potassium ion battery cell, wherein the alkali-metal bis (oxalato) borate salt is dissolved in the organic solvent at a concentration of from 0.3 to 1.5 M.

11. The electrolyte solution according to claim 10, wherein the organic solvent is N-methyl-2-pyrrolidone (NMP).

12. The electrolyte solution according to claim 10, wherein the organic solvent is trimethyl phosphate (TMP).

13. The electrolyte solution according to claim 10, wherein said organic solvent is a mixture of N-methyl-2-pyrrolidone (NMP) and trimethyl phosphate (TMP).

14. The electrolyte solution according to claim 13, wherein said organic solvent is N-methyl-2-pyrrolidone (NMP) and trimethyl phosphate (TMP) in a volume ratio range of from 40:60 to 90:10.

15. The electrolyte solution according to claim 10, wherein said organic solvent is a mixture of N-methyl-2-pyrrolidone (NMP) and triethyl phosphate (TEP).

16. The electrolyte solution according to claim 10, wherein the alkali-metal bis(oxalato)borate salt is sodium bis(oxalato)borate salt.

17. The electrolyte solution according to claim 10, wherein the salt is dissolved in the organic solvent in a concentration of from 0.3 to 0.6 M.

18. The electrolyte solution according to claim 17, wherein the salt is dissolved in the organic solvent in a concentration of from 0.5 to 0.6 M.

19. The electrolyte solution according to claim 10, wherein the electrolyte solution is fluorine-free.

20. A method for preparing an electrolyte solution comprising:

providing an alkali-metal bis (oxalato) borate salt, wherein the alkali metal ion is selected from sodium ($Na^+$) and potassium ($K^+$)

dissolving said salt in an organic solvent being N-methyl-2-pyrrolidone (NMP), wherein the electrolyte solution is for use in a sodium or potassium ion battery cell, wherein the alkali-metal bis(oxalato)borate salt is dissolved in the organic solvent at a concentration of from 0.3 to 1.5 M.

* * * * *